Nov. 3, 1964   W. C. DANIEL   3,155,255
LIFT DOLLY
Filed June 29, 1962   2 Sheets-Sheet 1
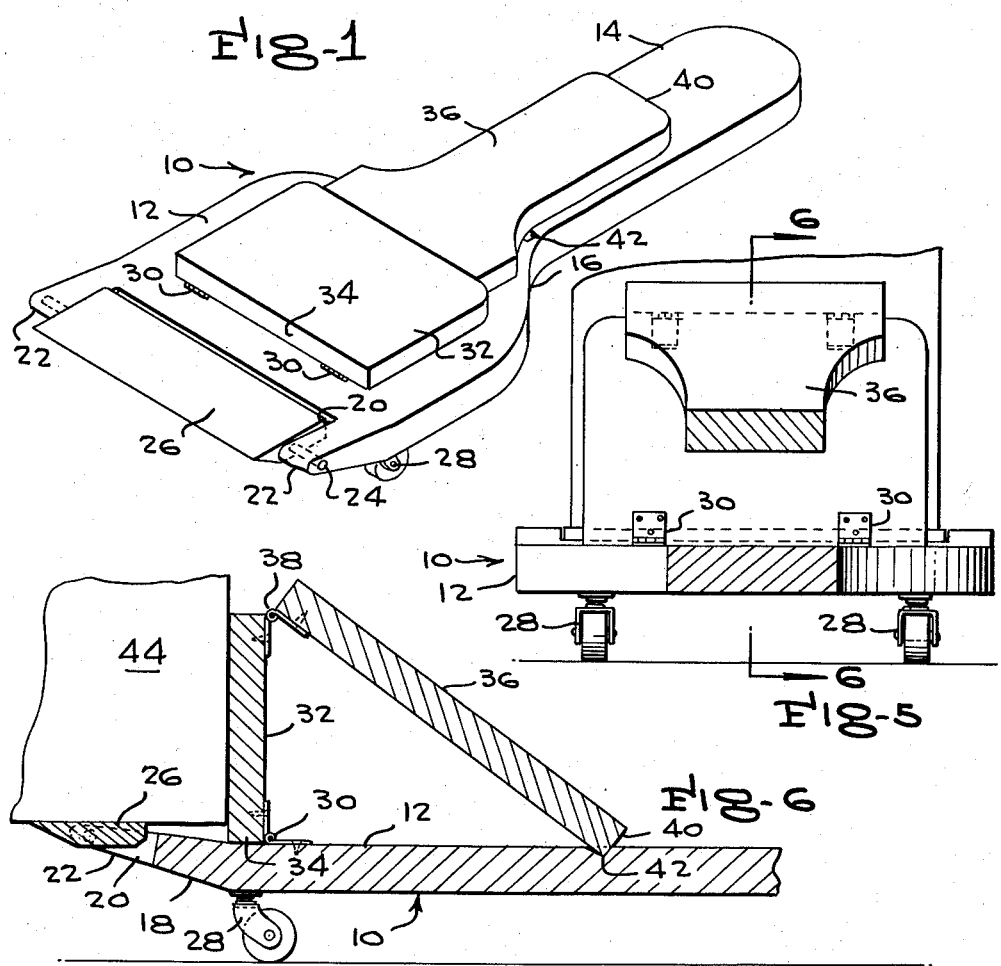
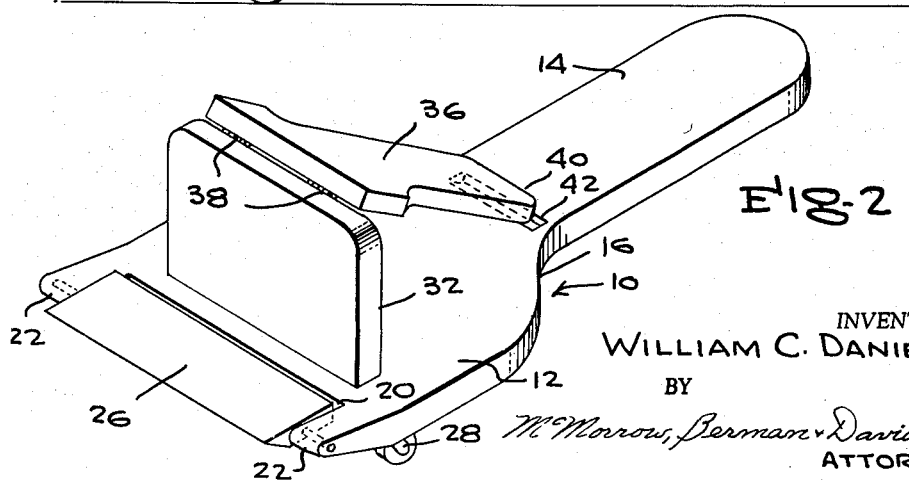
INVENTOR.
WILLIAM C. DANIEL
BY
McMorrow, Berman & Davidson
ATTORNEYS Nov. 3, 1964
W. C. DANIEL
3,155,255
LIFT DOLLY
Filed June 29, 1962
2 Sheets-Sheet 2
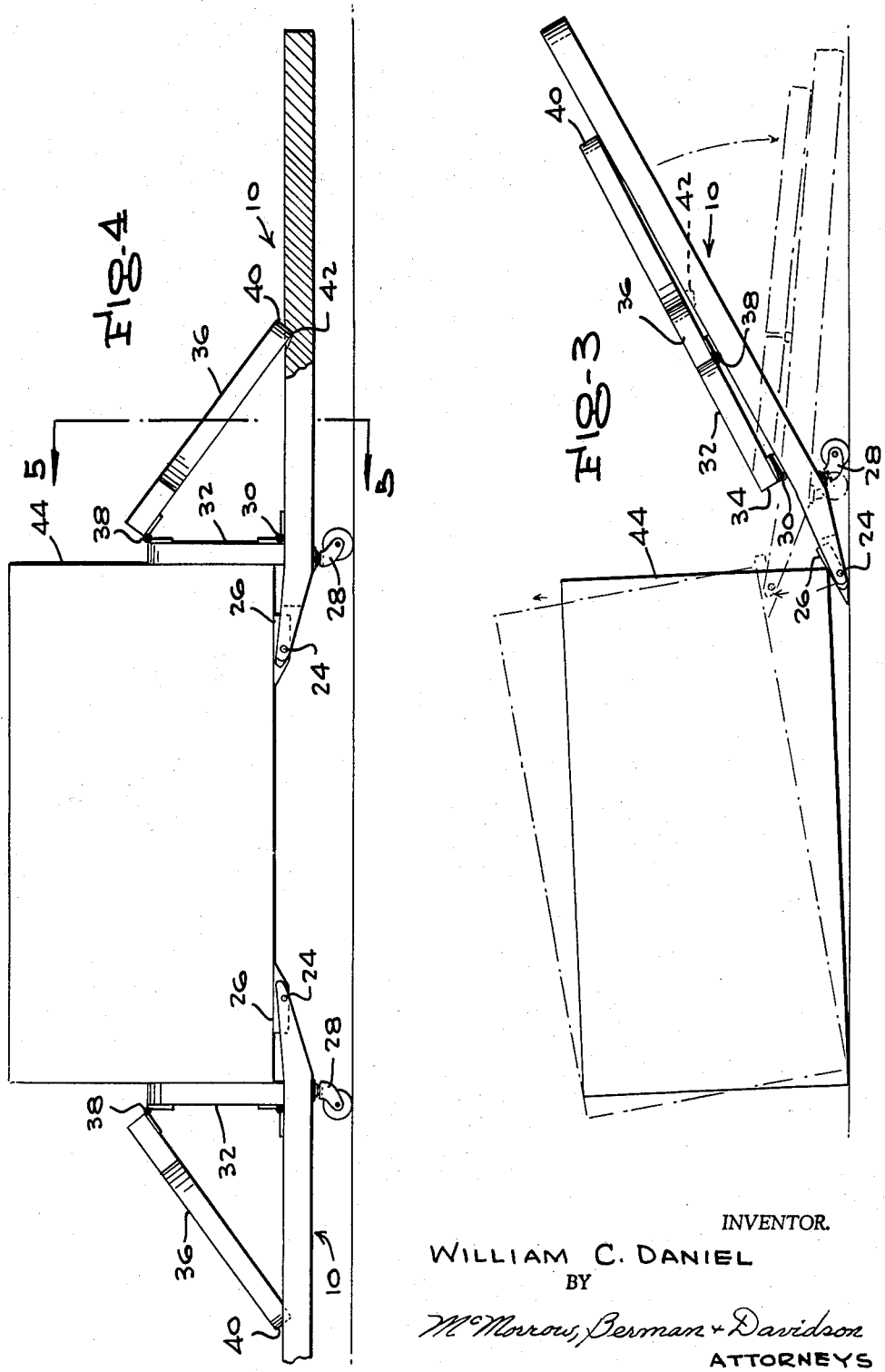
INVENTOR.
WILLIAM C. DANIEL
BY
McMorrow, Berman & Davidson
ATTORNEYS

United States Patent Office 3,155,255
Patented Nov. 3, 1964

3,155,255
LIFT DOLLY
William C. Daniel, 3338 Paris Drive, Dayton, Ohio
Filed June 29, 1962, Ser. No. 206,293
8 Claims. (Cl. 214—370)

This invention relates a a dolly for lift and transport of heavy loads, and in particular to a form of dolly which, in addition to its capability of picking up a load is adapted, when used in pairs, to function as a transport vehicle, and thus relieve the operator, after the initial lift, from any part of the load-sustaining effort.

It is, accordingly, a general object of the invention to minimize operator effort in unpowered lift and transfer operations. More particularly, it is an object to provide lifting dollies capable of ready conversion into self-sustaining vehicles. A further object, related to the foregoing, is to provide a single-axis dolly having articulated thrust reaction members adapted for alternative folding, and extension to a position providing contact with the load to utilize the load itself in sustaining it in raised position. Yet another object is to provide reaction members as aforesaid which are simple in mechanical structure and arrangement, and facile in use, yet sturdy and reliable in operation.

Other objects include provision of a dolly of the general nature aforesaid, which is low in cost and easy of manufacture.

These and other ends, which will be readily apparent, are attained by the present invention, which, in a preferred embodiment may be briefly described as comprising a platform with caster wheels adjacent one end, a plate-like element hinged near the wheel-bearing end, on the top of the platform, for swinging movement from a position flat on the dolly surface to a position perpendicular thereto, and having at its outer edge a further hinged plate, the outer edge of which is adapted to engage in a niche or groove in the dolly to hold the first plate in upright position. In addition to the foregoing, in the preferred form, the dolly has an adjustable, prying edge in the form of a separate element mounted for free rotation on an axis parallel to the normal axis of the dolly rollers.

For a more detailed description, reference is made to the following specification, as illustrated in the drawings, in which:

FIGURE 1 is a perspective view of the dolly, with the articulated reaction unit in folded position, FIGURE 2 is a view similar to FIGURE 1, showing the reaction unit raised to working position, FIGURE 3 is a side elevational view of the dolly, as applied to a load in a lifting operation, showing a subsequent stage in broken lines, FIGURE 4 is a side elevational view, partly in section, of a pair of dollies fully supporting a load, FIGURE 5 is a sectional view taken on the line 5—5 of FIGURE 4, and FIGURE 6 is a sectional view taken on the line 6—6 of FIGURE 5.

Referring to the drawings by characters of reference, there is shown a dolly of highly simplified construction comprising a platform 10, of hard wood, metal, or other suitable material, having a wide section 12 at one end, constituting a working base area, and a relatively narrow handle portion 14, for leverage application with the foot or hand of an operator, the two portions being joined by edge zones 16 of S curvature.

As seen in FIGURE 6, the front end of section 12 has a slightly upwardly inclined prying edge 18, generally wedge-form in cross section, having a centrally disposed slot 20 in its leading edge, leaving narrow fingers 22 at the two ends of the leading edge, having aligned axial bores receiving a pin 24, on which an auxiliary leading edge unit 26 is rotatively mounted, for angular adjustment with respect to the plane of the dolly. A pair of caster units 28 are secured in the under side of the dolly platform at about the rearward terminus of leading edge 18.

On its upper face, the platform 10 carries a pair of hinges 30, to which is secured a slab or plate 32, for swinging movement, the hinge axis being parallel to the leading edge of the dolly. In its upright position, as shown in FIGURE 6, the edge 34 of plate 32 at its anchored end dwells on the surface of wide section 12 of the platform, and it is sustained in this position by a leaf 36, of generally T form, swingably mounted at the outer end of plate 32 by hinges 38, and one corner of its outer edge 40 being adapted for holding engagement in a groove 42, with angularly disposed sides roughly mating with the corner of the leaf edge.

In use, the dolly thus described, with the reaction members 32, 36 folded on its top side, is brought into engagement with a lower corner of a crate 44, or other load, and the rotatable, leading edge unit 26 pried into position under the load to initiate lifting, as shown in FIGURE 3. After initial prying entry, the dolly is easily manipulated, to raise the load further, as shown in broken lines in FIGURE 3, and during this manipulation, which can take place quicker than it takes to read a description thereof, the leading edge may also be advanced along the bottom of the load, so that the end face of the load is about at the position of the casters. Throughout the manipulation, the swingable prying unit 26 remains in flush contact with the under side of the load, which prevents gouging and therefore facilitates movement of sliding adjustment of the prying unit. After the prying end has been suitably located on the under side of the load, the plate 32 is swung upward into position adjacent the end face of the load, as shown in FIGURE 4, and locked in this position by engagement of the end of leaf 36 in groove 42. Alternatively, the plate 32 may be raised prior to the lifting operation, in which case the plate will serve as a stop means to indicate proper location of the prying end of the dolly under the load.

In order to render sustenance of the load complete, a similar dolly is used to raise the opposite end of the load, with a result as shown in FIGURE 4, wherein all downward components of the gravity forces due to the load, which would tend to lower the prying ends of the dollies, by swing about the caster wheels, are effectively resisted by the reaction forces due to the clamping action of plates 32 against the ends of the load, which forces are brought into play by the tendency of the load to swing the prying ends of the dollies downward, and this clamping action increases in proportion to the magnitude of the load. As a result, the system shown in FIGURE 4 is functionally the same as if the two dollies were actually connected together by a rigid frame or chassis, and there results, in effect, a vehicle, supporting the full load of the object, which may therefore be wheeled about.

Unloading is easily accomplished by a relatively slight downward pressure, as with the foot, on outer section 14 of the dolly, which relieves the reaction load of the end of leaf 36 in groove 42, thereby enabling easy removal of the leaf edge from the groove, after which the load is sustained only by downward pressure on dolly section 14, which is relaxed to permit lowering of the load to the ground or floor, followed by withdrawal of the dolly.

By the use of a device as described herein, it has been found possible for people of only minor physical strength, including women, to singly handle heavy and cumbersome items, such as appliances, running as high as 400 pounds in weight.

While a certain preferred embodiment has been shown and described, various modifications will be apparent, in the light of this disclosure, and the invention should not, therefore, be deemed as limited, except insofar as shall appear from the spirit and scope of the appended claims.

I claim:

1. A lift and transport dolly, comprising a platform with a wide portion having a wedge-form leading edge, a pair of casters on its underside adjacent said leading edge, and a narrow portion extending from said wide portion on the end opposite said leading edge, and constituting a leverage handle, said leading edge having a slot, and a wedge-form element mounted in said slot, with a leading edge parallel to the leading edge of said wide portion, and arranged for rotation of its leading edge about an axis parallel to the leading edge of said wide portion, a first plate mounted for swinging movement on top of said wide portion adjacent the position of said casters, and an axis parallel to said leading edges, and a second plate mounted at the outer edge of said first plate for swinging movement on an axis parallel to said leading edges, said platform having a groove in its upper surface adapted to receive a corner edge of said second plate when said first plate is in a position substantially perpendicular to said platform.

2. A lift and transport dolly, comprising a platform with a wide portion having a wedge-form leading edge, rollers on its underside adjacent said leading edge, and a narrow portion extending from said wide portion on the end opposite said leading edge, and constituting a leverage handle, said leading edge having a slot, and a wedge-form element mounted in said slot, with a leading edge parallel to the leading edge of said wide portion, and arranged for rotation of its leading edge about an axis parallel to the leading edge of said wide portion, a first plate mounted for swinging movement on top of said wide portion adjacent the position of said rollers, on an axis parallel to said leading edges, and a second plate mounted at the outer edge of said first plate for swinging movement on an axis parallel to said leading edges, said platform having a groove in its upper surface adapted to receive a corner edge of said second plate when said first plate is in a position substantially perpendicular to said platform.

3. A lift and transport dolly, comprising an elongate platform with a wedge-form leading edge, rollers on its underside adjacent said leading edge, said leading edge having a slot, and a wedge-form element mounted in said slot, with a leading edge parallel to the leading edge of said platform and arranged for rotation of its leading edge about an axis parallel to the leading edge of said platform, a first plate mounted for swinging movement on top of said platform adjacent the position of said rollers, on an axis parallel to said leading edges, and a second plate mounted at the outer edge of said first plate for swinging movement on an axis parallel to said leading edges, said platform having a groove in its upper surface adapted to receive a corner edge of said second plate when said first plate is in a position substantially perpendicular to said platform.

4. A lift and transport dolly, comprising an elongate platform with a wedge-form leading edge, rollers on its underside adjacent said leading edge, a first plate mounted for swinging movement on top of said platform adjacent the position of said rollers, on an axis parallel to said leading edge, and a second plate mounted at the outer edge of said first plate for swinging movement on an axis parallel to said leading edge, said platform having a groove in its upper surface adapted to receive a corner edge of said second plate when said first plate is in a position substantially perpendicular to said platform.

5. A lift and transport dolly comprising an elongate platform with a tapered leading edge, and support rollers on its underside near said leading edge, a two-part, foldable plate, with its parts articulated together on an axis located medially of the length of the plate, said plate having a free outer edge, and an inner end mounted for swinging movement on a horizontal axis at one of its ends on top of said platform, adjacent said rollers, and said plate adapted to lie flat on said platform, and stop means on said platform adapted to engage the said free, outer edge of said plate, with said plate folded into an acute angle.

6. A device as in claim 5, said leading edge having a medial slot, and an auxiliary unit with a tapered leading edge mounted in said slot for swinging movement of its leading edge.

7. A device as in claim 5, said platform having a groove adapted to receive the outer edge of said plate, and constituting said stop means.

8. A device as in claim 5, said leading edge having a medial slot, and an auxiliary unit with a tapered leading edge mounted in said slot for swinging movement of said leading edge, and said platform having a groove adapted to receive the outer edge of said plate, and constituting said stop means.

References Cited in the file of this patent
UNITED STATES PATENTS

| | | |
|---|---|---|
| 2,296,610 | Grassick | Sept. 22, 1942 |
| 2,725,946 | Welter | Dec. 6, 1955 |
| 2,859,012 | Oleson et al. | Nov. 4, 1958 |